106. COMPOSITIONS, COATING OR PLASTIC.

Patented Sept. 23, 1930

1,776,749

UNITED STATES PATENT OFFICE

FRANK J. BUCK, OF LIBBY, MONTANA, ASSIGNOR TO VERMICULITE & ASBESTOS COMPANY, OF LIBBY, MONTANA

COMPOSITION OF MATTER

No Drawing.   Application filed October 31, 1927.   Serial No. 230,190.

This invention pertains to a composition of matter, and more particularly a composition which will resist heat, and will produce a substantial degree of fire proofing when made in the form of plaster, wall board, paint, calcimine, and in any use where high heat resisting properties will be found to be advantageous.

The composition of matter forming the substance of the present invention has for its base, the mineral known as vermiculite, which is a certain form of mica that expands by heating and turns a golden color, being very light and withstanding a very high temperature. To adapt this mineral for use, there is incorporated therewith a chemical binder which binds the vermiculite together into a very hard mass without destroying the golden color of the base, the resulting composition withstanding the flame of a blow torch.

In forming the composition, the ground vermiculite is passed through a furnace and heated until the water of crystallization is expelled. It is then ground to the desired degree of fineness, or it may be used in the condition in which it is removed from the furnace. For use as plaster, or stucco, the heat treated vermiculite is ground and screened, or separated by air to the desired fineness.

The resulting product is mixed with approximately from 1% to 5% by weight of very finely ground crystallized sodium silicate, the resulting composition ranging usually from between six mesh to 200 mesh. For ready mixed plaster "wet" a binder of sodium silicate which has been boiled with a small amount of copper oxide is employed.

It has also been found that a binder composed of 5 parts by weight of gelatine and 1 part by weight of acid potassium chromate will form a binder which is slightly flexible and yet wear resisting, the resulting composition being adaptable to serve as a binder for floor tile.

When the sodium silicate binder is boiled with copper oxide, as above mentioned, it has been found that the presence of the said oxide will prevent "sweating", due to the absorption of moisture.

The various operations will be apparent to a worker skilled in this art, the steps simply being the dehydrating and comminuting of the vermiculite, and mechanical intermixing therewith of the required amount of binder.

It may be pointed out that a thin board with a quarter inch coating of vermiculite plaster was subjected to the flame of an oxygen welding torch for several minutes. On removing a portion of the plaster, the board was not charred, and the plaster was not injured. Many other tests for showing the high heat resisting and high heat insulating properties of this material might be mentioned.

The gelatine acid potassium chromate binder is formed by taking 5 parts of gelatine and adding thereto 1 part of acid potassium chromate.

It will be understood that it is desired to comprehend within the scope of this invention such modifications as may be found necessary to adapt it to varying conditions and uses.

I claim:

A composition of matter comprising comminuted ignited vermiculite, and a mixture of boiled sodium silicate and copper oxide.

FRANK J. BUCK.